United States Patent [19]

Goldberg et al.

[11] Patent Number: 4,991,392
[45] Date of Patent: Feb. 12, 1991

[54] ALTITUDE-SENSITIVE FUEL FLOW CONTROL DEVICE

[75] Inventors: Gary L. Goldberg, San Diego; Sam S. Navidi, Poway; Wendell E. Reed, Chula Vista, all of Calif.

[73] Assignee: Sundstrand Corporation, Rockford, Ill.

[21] Appl. No.: 489,022

[22] Filed: Mar. 6, 1990

[51] Int. Cl.$^5$ .............................................. F02D 35/00
[52] U.S. Cl. ................................ 60/39.281; 137/81.1; 137/501
[58] Field of Search ............................. 137/81.1, 501; 60/39.281; 123/465

[56] References Cited

U.S. PATENT DOCUMENTS

| | | | |
|---|---|---|---|
| 2,674,847 | 4/1954 | Davies et al. | 137/501 X |
| 3,041,826 | 7/1962 | Coar | 60/39.281 |
| 3,791,413 | 2/1974 | Muller et al. | 137/625.3 |
| 4,034,559 | 7/1977 | Dimitriev et al. | 60/39.281 |
| 4,155,535 | 5/1979 | Seamone | 137/625.3 X |
| 4,391,290 | 7/1983 | Williams | 137/81.1 |

FOREIGN PATENT DOCUMENTS 1153181 8/1963 Fed. Rep. of Germany ...... 137/501

Primary Examiner—Stephen M. Hepperle
Attorney, Agent, or Firm—Wood, Phillips, Mason, Recktenwald & Van Santen

[57] ABSTRACT

In order to control fuel flow at a fuel delivery point for auxiliary power units, and for other low fuel flow applications, an altitude-sensitive fuel flow control device (10) includes a fuel inlet (12) in communication with a fuel source and a fuel outlet (14) in communication with a fuel combustor. The device (10) includes an axially extending rod (16) having a metering surface (22) intermediate the ends (24, 26) thereof which may be located in various positions relative to a fuel flow path (18a, 18b, 18c, 18d, 18e) extending from the fuel inlet (12) to the fuel outlet (14) by axial movement of the rod (16) which varies fuel flow within a preselected range of altitude-dependent fuel flow rates. In order to move the axially extending rod (16) to variously position the metering surface (22) relative to the fuel flow path (18a, 18b, 18c, 18d, 18e), an aneroid bellows (28) movable responsive to changes in ambient pressure is interconnected with the axially extending rod (16) and a differential pressure regulaator (52) is in communication with the fuel flow path (18a, 18b, 18c, 18d, 18e) upstream and downstream of the metering surface (22) for maintaining a constant pressure drop independently of altitude.

17 Claims, 1 Drawing Sheet

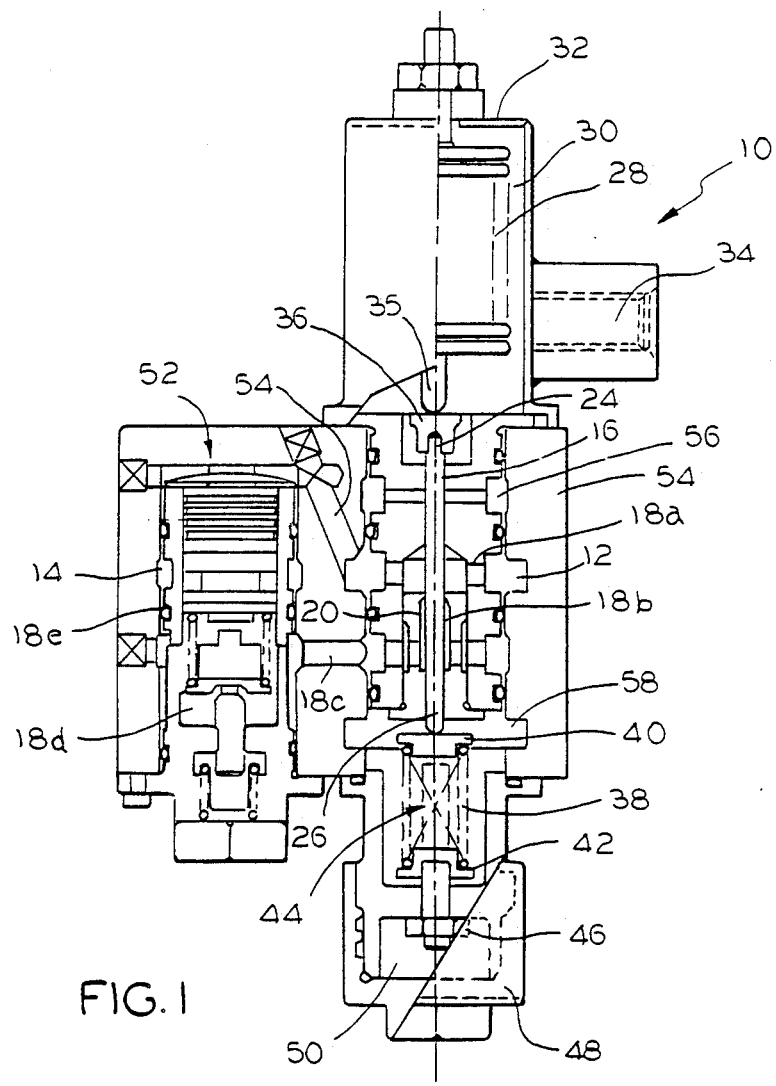
FIG. 1
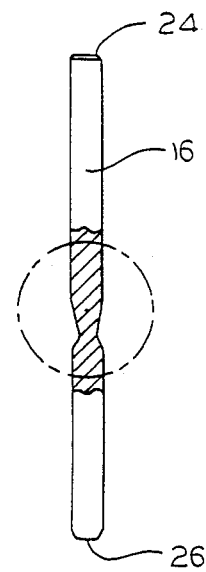
FIG. 2
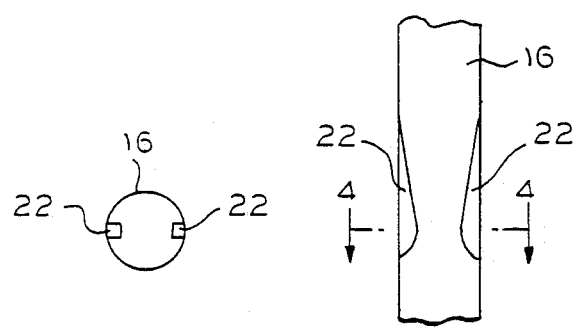
FIG. 4
FIG. 3

ALTITUDE-SENSITIVE FUEL FLOW CONTROL DEVICE

FIELD OF THE INVENTION

The present invention relates generally to fuel flow control devices and, more particularly, to a fuel flow control device responsive to changes in ambient pressure so as to be altitude-sensitive.

BACKGROUND OF THE INVENTION

Generally speaking, there are many applications in diverse fields where it is necessary or desirable to control fuel flow. Such applications and fields are widespread and often have significantly different requirements or parameters that must be met for successful operation of the device being supplied with fuel. As a result, the art is replete with fuel flow control devices directed to a number of problems encountered in each of such applications and fields.

By way of example, Gayfer et al U.S. Pat. No. 3,976,310 discloses what can only be described as an unusually complex fuel flow control system. It apparently utilizes a bellows and fluted rod as a pilot to control differential pressure across a metering area which is typical of high volume flow applications for main engines such as those on a helicopter or the like. As an indication of the complexity of the fuel flow control system, Gayfer et al use a centrifugal pump, gears, a flyweight control, etc.

In addition, Gayfer et al operates by sensing compressor discharge pressure. Thus, their fuel flow control system utilizes two restrictors which, if clogged, will render the unit entirely inoperable. Further, because of the use of lip seals, the fluted rod must be rotated in order to prevent stiction.

Because of the need to rotate the fluted rod, the Gayfer et al device cannot be located remote from the fuel pump which is desirable for some applications. This also follows because of the fact that the Gayfer et al device requires a return flow to the fuel pump inlet. As a result, the Gayfer et al device cannot be located close to a combustor which would be advantageous in order to minimize line filling during startup.

In view of the foregoing, the Gayfer et al device would be entirely unsuitable for utilization in low fuel flow applications. For instance, this type of device, which might be suitable for main engine applications, could not be commercially utilized for combustors in small auxiliary power units and the like. In fact, there has been no entirely satisfactory flow control device that can be located at a fuel delivery point for low fuel flow applications.

The present invention is directed to overcoming one or more of the foregoing problems and achieving one or more of the resulting objects.

SUMMARY OF THE INVENTION

It is a principal object of the present invention to provide a new and improved altitude-sensitive fuel flow control device. It is a further object of the present invention to provide a fuel flow control device which is not only altitude-sensitive but also responsive to ambient pressure. It is still another object of the present invention to provide a fuel flow control device that is entirely hydromechanical.

An exemplary embodiment of the invention achieves the foregoing objects in an altitude-sensitive fuel flow control device having a fuel inlet in communication with a fuel source and a fuel outlet in communication with a fuel combustor. The device also includes means for metering fuel flow intermediate the fuel inlet and the fuel outlet. The metering means is disposed in a fuel flow path extending from the fuel inlet to the fuel outlet and is adapted to supply fuel to the fuel combustor within a preselected range of altitude-dependent fuel flow rates. The device contemplates the metering means being movable so as to vary fuel flow rates within the preselected range. With this arrangement, means are provided for moving the metering means responsive to altitude to vary fuel flow rates within the preselected range and for maintaining a constant pressure drop across the metering means independently of altitude.

Additional details of the present invention include the fuel flow path having a metering chamber intermediate the fuel inlet and the fuel outlet. The metering means is then movable relative to the metering chamber in order to vary fuel flow rates within the preselected range dependent upon altitude. The metering means preferably comprises an axially extending rod having a metering surface located intermediate the ends thereof. In a highly preferred embodiment, the axially extending rod is axially movable to variously position the metering surface relative to the metering chamber in the fuel flow path.

Preferably, the means for moving the metering means responsive to altitude comprises an aneroid bellows movable responsive to changes in ambient pressure and positioned so as to be operatively interconnected to the axially extending rod. Further, the means for maintaining the constant pressure drop comprises a differential pressure regulator advantageously in communication with the fuel flow path upstream and downstream of the metering surface and metering chamber.

Still additional details of the present invention may include the aneroid bellows being disposed in a chamber which is openly exposed to ambient pressure at all times such that the axially extending rod has one end in contact with the aneroid bellows. The aneroid bellows can then contract and expand within the chamber responsive to increases and decreases in ambient pressure, respectively, to move the rod in cooperation with biasing means at the other end of the axially extending rod in a controlled manner. In a most highly preferred embodiment, means are provided for adjusting the biasing means to thereby adjust the preselected range of altitude-dependent fuel flow rates by relocating the metering surface in relation to the metering chamber for any given ambient pressure.

Other objects, advantages and features of the present invention will become apparent from a consideration of the following specification taken in conjunction with the accompanying drawings.

BRIEF DESCRIPTION OF THE DRAWINGS

FIG. 1 is a cross-sectional view of an altitude sensitive fuel flow control device in accordance with the present invention;

FIG. 2 is a front elevational view, partially in section, of an axially extending metering rod for the device of FIG. 1;

FIG. 3 is an enlarged detail view of a metering surface of the axially extending metering rod as illustrated in FIG. 2; and FIG. 4 is a cross-sectional view taken on the line 4—4 of FIG. 3 to show the metering surface of the axially extending rod.

In the illustration given, and with reference first to FIG. 1, the reference numeral 10 designates generally an altitude-sensitive fuel flow control device in accordance with the present invention. The device 10 includes a fuel inlet 12 in communication with a fuel source (not shown) and a fuel outlet 14 in communication with a fuel combustor (not shown). It will also be seen that the device 10 includes means for metering fuel flow intermediate the fuel inlet 12 and the fuel outlet 14. In particular, the metering means comprises an axially extending metering rod generally designated 16 (see, also, FIG. 2) which is disclosed in a one-way fuel flow path 18a, 18b, 18c, 18d, 18e extending from the fuel inlet 12 to the fuel outlet 14 and adapted to supply fuel to the fuel combustor within a preselected range of altitude-dependent fuel flow rates. It will further be seen that the device is such that the rod 16 is movable to vary fuel flow rates within the preselected range. The device 10 still further includes means for moving the rod 16 responsive to altitude and means for maintaining a constant pressure drop across the rod 16 independently of altitude.

Referring to FIG. 1, the fuel flow path 18a through 18e includes a metering chamber 20 which extends axially at a point generally intermediate the fuel inlet 12 and the fuel outlet 14. The axially extending rod 16 has a fluted metering surface as at 22 (see FIG. 3), preferably at diametrically opposite positions (see, also, FIG. 4), which is located in juxtaposition to the metering chamber 20 intermediate the ends 24 and 26 of the rod 16. With this arrangement, the rod 16 is axially movable to variously position the fluted metering surface 22 relative to the metering chamber 20 to cause the fuel flow rate to be varied within an altitude-dependent preselected range.

As shown in FIG. 1, the means for moving the axially extending rod 16 responsive to altitude comprises an aneroid bellows 28. The aneroid bellows 28 is in contact with the axially extending rod 16 and is axially movable responsive to changes in ambient pressure. It is also disposed in a chamber 30 defined by a housing 32 having a pressure sensing port 34 through which the aneroid bellows 28 is openly and directly in communication with ambient pressure. The aneroid bellows 28 can thus contract and expand within the chamber 30 responsive to increases and decreases in ambient pressure, respectively. It further has a projecting finger 35 in contact with a saddle 36 on one end 24 of the axially extending rod 16 and a spring 38 biases the other end 26 of the axially extending rod 16. The aneroid bellows 28 and the spring cooperate to impart controlled axial movement to the rod 16. As shown, the spring 38 is carried between an end plate 40 and a flange fitting 42 through which passes a threaded adjustment rod 44.

With this arrangement, it will be appreciated that the force of the spring 38 against which the aneroid bellows 28 acts can be adjusted by selecting a spring having a desired spring constant to thereby adjust the preselected range of altitude-dependent fuel flow rates by relocating the fluted metering surface 22 in relation to the metering chamber 20 for any given ambient pressure. In addition, the threaded rod 44 which passes through the flange fitting 42 can be movably adjusted by means of the nut 46 following removal of a cap 48 to gain access to the chamber 50 to thus serve as a variably positionable maximum altitude stop adjustment. In this connection, the aneroid bellows 28 and the spring 38 cooperatively axially position the axially extending rod 16 which, in turn, cooperatively axially positions the fluted metering surface 22 relative to the metering chamber 20 to form a variable flow passage in the flow path portion 18b. In this manner, the variable flow passage as at 18b is sized in direct relation to the axial position of the axially extending rod 16 and is adapted to provide a fuel flow rate to the fuel outlet 14 directly proportional to the instantaneous ambient pressure.

Still referring to FIG. 1, the means for maintaining the constant pressure drop comprises a differential pressure regulator generally designated 52 which is in communication with the fuel flow path by means of a fuel conduit 54 upstream of the fluted metering surface 22 and by means of the flow path portion 18d downstream of the fluted metering surface 22. With this arrangement, the differential pressure regulator 52 provides a regulated fuel flow rate to the fuel combustor linearly proportional to sensed pressure by maintaining the constant pressure drop across the metering means, i.e., the fluted metering surface 22 and metering chamber 20 defining the variable flow passage.

As for further details of the differential pressure regulator 52, it will be appreciated that it may be entirely conventional in construction. Thus, it need not be described in detail herein in order to avoid unnecessary repetition and inasmuch as those skilled in the art will appreciate the construction and operation thereof. Moreover, the differential pressure regulator 52 is merely exemplary of those that can be utilized to maintain a constant pressure drop across the metering means.

As will be appreciated, a pressure source supplies fuel under pressure to the fuel inlet 12 such that fuel flows down the axially extending rod 16. In particular, fuel flows down the axially extending rod 16 to the fluted metering surface 22 and the flow area of the fluted metering surface 22 varies with the ambient pressure acting on the aneroid bellows 28, i.e., it varies with altitude. By reason of the differential pressure regulator 52, a constant differential pressure is maintained across the fluted metering surface 22.

As shown, the end 26 of the axially extending rod 16 is exposed to the pump inlet pressure to minimize pressure sensitivity whereas the end 24 is exposed to the pump inlet pressure to minimize leakage to the cavity 30. This boost pressure is relatively low and constant and it will be appreciated that the lower chamber pressure acts on the rod 16 as a piston. By having a low pressure in this region, the size and weight of the aneroid bellows 28 is minimized and the sensitivity of the assembly to ambient pressure is increased.

As illustrated in FIG. 1, the altitude-sensitive fuel flow control device 10 has no seals about the axially extending rod 16. Instead, fuel may flow along the rod 16 and ultimately to a drain line 54 which is in communication with a line back to the inlet of a fuel pump (which may be at a remote location). In this connection, the drain line 54 communicates with chambers 56 and 58 in the vicinity of the ends 24 and 26 of the rod 16, respectively.

As best shown in FIGS. 2 through 4, the fluted metering surface 22 provides a variable area with respect to the linear stroke to provide flow control. A narrow slot is cut into diametrically opposite sides of the rod 16 with the depth varying along the length such that, at any position, the flow area is a product of the fixed width and the variable depth. With such fluted metering surface 22, very low flow rates on the order of 12 to 24 pounds per hour can be achieved in a precisely controlled manner.

With the present invention, the device 10 is well suited for use with a combustor of the type used in an auxiliary power unit. The fuel outlet 14 will then typically be in communication with a start injector (not shown) of the combustor. Significantly, the present invention makes it possible to maintain contamination tolerance and minimize close tolerance parts to provide cost effective manufacturing.

While in the foregoing there has been set forth a preferred embodiment of the invention, the details herein given may be varied by those skilled in the art without departing from the true spirit and the scope of the appended claims.

We claim:

1. An altitude-sensitive fuel flow control device comprising:
   a fuel inlet in communication with a fuel source and a fuel outlet in communication with a fuel combustor;
   means for metering fuel flow intermediate said fuel inlet and said fuel outlet including an axially extending rod having a metering surface intermediate the ends thereof, said axially extending rod being disposed in a fuel flow path extending from said fuel inlet to said fuel outlet and adapted to supply fuel to said fuel combustor within a preselected range of altitude-dependent fuel flow rates, said axially extending rod being axially movable to variously position said metering surface relative to said fuel flow path to vary fuel flow rates within said preselected range;
   means for moving said metering means responsive to altitude to vary fuel flow rates within said preselected range; and
   means for maintaining a constant pressure drop across said metering means independently of altitude.

2. The altitude-sensitive fuel flow control device of claim 1 wherein said fuel flow path includes a metering chamber intermediate said fuel inlet and said fuel outlet, said metering means being movable relative to said metering chamber to vary fuel flow rates within said preselected range dependent upon altitude.

3. The altitude-sensitive fuel flow control device of claim 1 wherein said means for moving said metering means responsive to altitude comprises an aneroid bellows, said aneroid bellows being operatively interconnected with said metering means and being movable responsive to changes in ambient pressure.

4. The altitude-sensitive fuel flow control device of claim 1 wherein said means for maintaining said constant pressure drop comprises a differential pressure regulator, said differential pressure regulator being in communication with said fuel flow path upstream and downstream of said metering means.

5. An altitude-sensitive fuel flow control device, comprising:
   a fuel inlet in communication with a fuel source and a fuel outlet in communication with a fuel combustor;
   means for metering fuel flow intermediate said fuel inlet and said fuel outlet, said metering means being disposed in a fuel flow path extending from said fuel inlet to said field outlet and adapted to supply fuel to said fuel combustor within a preselected range of altitude-dependent fuel flow rates, said metering means being movable to vary fuel flow rates within said preselected range;
   said fuel flow path including a metering chamber extending axially at a point intermediate said fuel inlet and said fuel outlet, said metering means comprising an axially extending rod having a metering surface intermediate the ends thereof and said rod being movable relative to said metering chamber to vary fuel flow mattes within said preselected range, said axially extending rod being movable to variously position said metering surface relative to said metering chamber;
   means for moving said metering means responsive to altitude to,vary fuel flow creates within said preselected range, said means for moving said metering means responsive to altitude comprising an aneroid bellows, said aneroid bellows being in contact with said axially extending rod and being axially movable responsive to changes in ambient pressure, said axially extending rod having one end in contact with said aneroid bellows, and including means for biasing the other end of said axially extending rod toward said aneroid bellows for controlled axial movement thereof; and
   means for maintaining a constant pressure drop across said metering means independently of altitude.

6. The altitude-sensitive fuel flow control device of claim 5 wherein said aneroid bellows is disposed in a chamber in open, direct communication with ambient pressure, said aneroid bellows contracting and expanding within said chamber with increases and decreases in ambient pressure, respectively.

7. The altitude-sensitive fuel flow control device of claim 5 wherein said means for maintaining said constant pressure drop comprises a differential pressure regulator, said differential pressure regulator being in communication with said fuel flow path upstream and downstream of said metering means.

8. An altitude-sensitive fuel flow control device, comprising:
   a fuel inlet in communication with a fuel source and a fuel outlet in communication with a fuel combustor;
   means for metering fuel flow intermediate said fuel inlet and said fuel outlet, said metering means being disposed in a one-way fuel flow path extending from said fuel inlet to said fuel outlet and adapted to supply fuel to said fuel combustor within a preselected range of altitude-dependent fuel flow rates, said metering means being movable to vary fuel flow rates within said preselected range;
   said fuel flow path including a metering chamber extending axially at a point generally intermediate said fuel inlet and said fuel outlet, said metering means comprising an axially extending rod having a fluted metering surface in juxtaposition to said metering chamber intermediate the ends thereof and said rod being axially movable to vary fuel flow rates within said preselected range dependent upon altitude, said axially extending rod being movable to variously position said fluted metering surface relative to said metering chamber;
   means for moving said metering means responsive to altitude to vary fuel flow rates within said preselected range; and means for maintaining a constant pressure drop across said metering means independently of altitude.

9. The altitude-sensitive fuel flow control device of claim 8 wherein said means for moving said metering means responsive to altitude comprises an aneroid bellows, said aneroid bellows being in contact with said axially extending rod and being axially movable responsive to changes in ambient pressure.

10. The altitude-sensitive fuel flow control device of claim 9 wherein said aneroid bellows is disposed in a chamber open, direct communication with ambient pressure, said aneroid bellows contracting and expanding within said chamber responsive to increases and decreases in ambient pressure, respectively.

11. The altitude-sensitive fuel flow control device of claim 10 wherein said axially extending rod has one end in contact with said aneroid bellows, and including means for biasing the other end of said axially extending rod toward said aneroid bellows for controlled axial movement thereof.

12. The altitude-sensitive fuel flow control device of claim 11 wherein said means for maintaining said constant pressure drop comprises a differential pressure regulator, said differential pressure regulator being in communication with said fuel flow path upstream and downstream of said fluted metering surface.

13. The altitude-sensitive fuel flow control device of claim 11 including means for adjusting said biasing means to thereby adjust said preselected range of altitude-dependent fuel flow rates by relocating said fluted metering surface in relation to said metering chamber for any given ambient pressure.

14. The altitude-sensitive fuel flow control device of claim 11 wherein said aneroid bellows and said biasing means cooperatively axially position said axially extending rod, said fluted metering surface being cooperatively axially positioned relative to said metering chamber to form a variable flow passage.

15. The altitude-sensitive fuel flow control device of claim 14 wherein said variable flow passage is sized in direct relation to the axial position of said axially extending rod, said variable flow passage providing a fuel flow rate to said fuel outlet directly proportional to instantaneous ambient pressure.

16. The altitude-sensitive fuel flow control device of claim 12 wherein said differential pressure regulator provides a regulated fuel flow rate to said fuel combustor linearly proportional to sensed pressure by maintaining said constant pressure drop across said metering means.

17. The altitude-sensitive fuel flow control device of claim 8 wherein said fuel combustor is a combustor of an auxiliary power unit and said fuel outlet is in communication with a start injector of said combustor of said auxiliary power unit.

* * * * *